(12) United States Patent
Tsutsumi et al.

(10) Patent No.: US 6,464,776 B1
(45) Date of Patent: Oct. 15, 2002

(54) DUSTING-INHIBITED CEMENT COMPOSITION IMPROVED IN STRENGTH

(75) Inventors: Hirofumi Tsutsumi, Fukuoka; Teruo Urano, Tochigi; Masatsune Ogura, Chiba; Tetsuya Shimoda, Tokyo, all of (JP)

(73) Assignees: Aso Cement Co., Ltd., Fukuoka (JP); Murakashi Lime Industry Co., Ltd., Tochigi (JP); Nippon Hodo Co., Ltd., Tokyo (JP); Du Pont - Mitsui Fluorochemicals Co., LTD, Tokyo (JP)

( * ) Notice: Subject to any disclaimer, the term of this patent is extended or adjusted under 35 U.S.C. 154(b) by 0 days.

(21) Appl. No.: 09/622,935

(22) PCT Filed: Dec. 15, 1999

(86) PCT No.: PCT/JP99/07046

§ 371 (c)(1),
(2), (4) Date: Feb. 21, 2001

(87) PCT Pub. No.: WO00/39050

PCT Pub. Date: Jul. 6, 2000

(30) Foreign Application Priority Data

Dec. 24, 1998 (JP) ............................................ 10-367009

(51) Int. Cl.$^7$ .......................... C04B 28/02; C04B 16/06; C04B 24/26; C09K 3/22
(52) U.S. Cl. ........................ 106/802; 106/696; 106/708; 106/724; 106/728; 106/806; 106/810; 106/823

(58) Field of Search .................................. 106/802, 806, 106/810, 696, 708, 724, 728, 823

(56) References Cited

U.S. PATENT DOCUMENTS

| | | | |
|---|---|---|---|
| 3,838,092 A | | 9/1974 | Vogt ............................ 524/546 |
| 5,210,112 A | * | 5/1993 | Shimoda et al. ............. 523/132 |
| 5,354,787 A | * | 10/1994 | Shimoda et al. ............. 523/132 |
| 5,480,584 A | * | 1/1996 | Urano et al. ................. 252/384 |
| 5,507,867 A | * | 4/1996 | Ruggiero et al. ............ 106/808 |

FOREIGN PATENT DOCUMENTS

| | | |
|---|---|---|
| JP | 63-074946 | 4/1988 |
| JP | 09-328340 | 12/1997 |

OTHER PUBLICATIONS

International Search Report (3/2000).

* cited by examiner

*Primary Examiner*—Anthony J. Green
(74) *Attorney, Agent, or Firm*—Sughrue Mion, PLLC

(57) ABSTRACT

The present invention provides a dusting-inhibited cement composition, which hardly forms dust and further capable of improving strength of concrete or mortar obtained therefrom. A dusting-inhibited cement composition according to the present invention comprises 100 weight parts of cement, 0.01~0.1 weight parts of fibrillatable polytetrafluoroethylene and 0.001~1.0 weight parts of alcohol base antifoamer and/or silicone base antifoamer.

2 Claims, 1 Drawing Sheet

DUSTING-INHIBITED CEMENT COMPOSITION IMPROVED IN STRENGTH

TECHNICAL FIELD

The present invention relates to a dusting-inhibited cement composition, which is treated to inhibit the emission of cement dust during transportation or storage of the cement.

BACKGROUND ART

For the purpose of preventing various bad effects caused by cement dust emitted into the air from cement during transportation or storage, there have been developed dusting-inhibited cements which are inhibited from the dust emission into the air by catching the cement powder with random nets of sub-micron size fine polytetrafluoroethylene (hereinafter polytetrafluoroethylene is denoted as PTFE) fibril obtained by adding fibrillatable PTFE to cement and subjecting the mixture to compression-shear to fibrillate the PTFE As to the art for manufacturing such dusting-inhibited cement, mention is made in Japanese Kokoku Patent Publication Hei 5-24872.

Further, Japanese Kokoku Patent Publication Sho 52-32877 discloses that a mixture of fibrillatable PTFE and a powdery material is subjected to compression-shear at 20~200° C. to fibrillate the PTFE so as to inhibit emission of dust from the powdery material.

Bulk density of cement subjected to the dusting-inhibiting process based on the art disclosed in Japanese Kokoku Patent Publication Hei 5-24872 or Sho 52-32877 tends to be lowered with entrained air in the powder due to the existence of the PTFE fibrils. Furthermore, strength of the concrete or mortar using the dusting-inhibited cement decreases to about 85~95% when compared to those without the treatment. Thus, an improvement in the strength has been desired.

The present inventors made studies on the cause of the decrease in strength of the concrete or mortar using the dusting-inhibited cement, and found out that numerous air bubbles formed in the concrete or mortar by the influence of the PTFE dusting-inhibiting agent brought about the decrease in compressive strength of the concrete or mortar made from the dusting-inhibited cement.

The problem to be solved by this invention is to provide a dusting-inhibited cement composition, which hardly emits dust and further capable of improving strength of concrete or mortar obtained therefrom.

DISCLOSURE OF THE INVENTION

A dusting-inhibited cement composition according to the present invention comprises 100 weight parts of cement, 0.01~0.1 weight parts of fibrillatable polytetrafluoroethylene and 0.001~1.0 weight parts of alcohol base antifoamer and/or silicone base antifoamer.

The fibrillatable PTFE is desirable to be fibrillated wholly or mostly for raising the dusting-inhibiting effect. The fibrils are formed when the fibrillatable PTFE is mixed with cement etc., and the mixture is subjected to the compression-shear for preparing the dusting-inhibited cement composition of the invention.

BEST MODE FOR CARRYING OUT THE INVENTION

Figure 1:
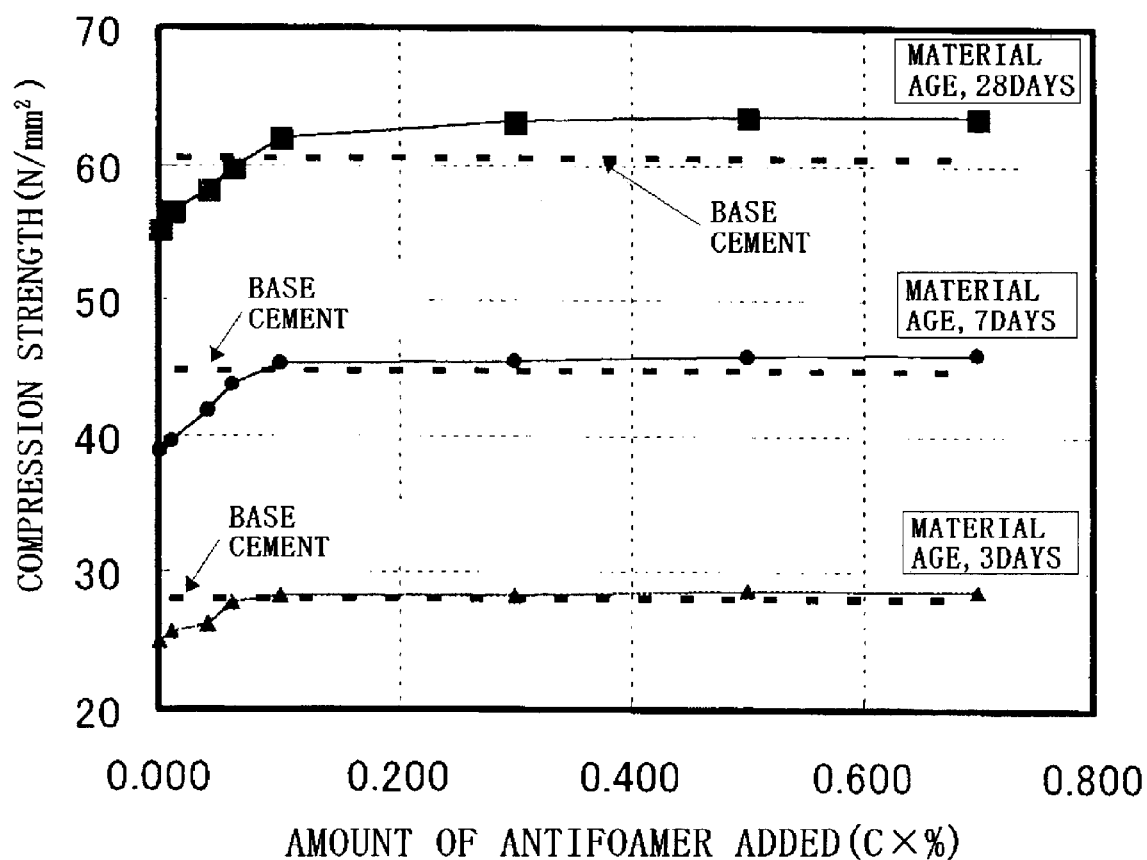
FIG. 1 is a graph showing the relation between the added quantities of antifoamer and compressive strength.

As for the cement, such mixed cements as Portland cement, blast-furnace slag cement, fly ash cement, silica cement, pozzolan cement and filler cement as well as other cements like alumina cement, geothermal well cement, oil-well cement, very rapidly hardening cement, colloid cement and expansive cement can be employed.

The fibrillatable PTEF is one manufactured by such an emulsion polymerization of tetrafluoroethylene as shown in the U.S. Pat. No. 2,559,750, and is fibrillated easily with compression-shear. There are two forms for the fibrillatable PTFE, namely powder form and emulsion form, and both of them can be used as the dusting-inhibiting agent of the present invention.

Alcohol base antifoamer and silicone base antifoamer are employed independently or in combination, and they can restrain formation of pores in the concrete or mortar that are brought about by use of the PTFE dusting-inhibiting agent, and prevent lowering of strength of the concrete or mortar. For the alcohol base antifoamer, there are higher alcohols, glycols, their ethers and esters, and they are specifically exemplified by hexadecyl alcohol, polyoxyalkyleneglycol, polyoxyalkyleneglycol higher alcohol ethers and polyalkyleneglycol fatty acid esters. As to the silicone base antifoamer, mentions are made on dimethylsilicone oil, silicone oil compounds, silicone emulsions and polyether-modified polysiloxanes.

When the content of PTFE per 100 weight parts cement is less than 0.01 weight parts, satisfactory dusting-inhibiting effect cannot be obtained, and more than 0.1 weight parts content causes excessive agglomeration of cement to result in inferior dispersion. Further, when the content of alcohol and/or silicone antifoamer is less than 0.001 weight parts, no sufficient improvements in strength is obtainable, and no further advanced effect can be expected by an increased contents of more than 1.0 weight parts to make it uneconomical.

By use of an appropriate amount of the antifoamer, the dusting-inhibited cement composition according to the present invention can accomplish improvements not only in the strength of the concrete or mortar, but also in the workability for preparation of the concrete or mortar without preventing formation of micron-size bubbles based on such air entraining agents as AE-agents and AE-water reducing agents, and further can accomplish improvements in anti-freezing properties of the concrete or mortar obtained. The maximum content of the antifoamer when used concomitantly with admixtures like AE-agents is about 0.5 weight parts, and an excessive addition of the antifoamer tends to decrease the above-mentioned effects of AE-agent, etc., due to decreased amounts of the entrained air.

The present invention will be explained further in detail below by means of Examples, however, the invention never be restricted to the following Examples.

In production steps of Portland cement, the calcined clinker is quenched by air, then the quenched clinker is crushed in a finishing mill under addition of such additives as gypsum, and after the particle size control, the cement product is obtained. To the cement discharged at 100~120° C. from the finishing mill, an aqueous emulsion of fibrillatable PTFE and an antifoamer are added, then the resulted material is mixed and agitated to induce compression-shear for fibrillation of the PTFE, and the dusting-inhibited cement composition according to the present invention is obtained efficiently.

For the preparation of the composition according to the present invention, the mixing with the cement can be accomplished easily when the PTFE emulsion and the antifoamer are employed under dilution or dissolution with water, and an effective preparation of the inventive dusting-inhibited cement composition can be obtained by keeping the temperature of the cement at around 90° C. by use of a heating apparatus or a thermal insulation apparatus for fibrillating the PTFE more readily. Addition of the antifoamer to the cement is preferably carried out prior to the addition of the fibrillatable PTFE, however, since vaporization or evaporation of the antifoamer as well as decrease in effectiveness of the antifoamer may occur due to heat generation during the dusting-inhibiting treatment of the cement, it is possible, if necessary, to prepare the dusting-inhibited cement composition according to the present invention by adding the antifoamer prior to or after addition of the water for preparation of the concrete or mortal.

In order to keep the temperature of cement at around 90° C., it is further possible to adopt a method that the temperature is raised by use of the heat of hydration obtained by mixing with water a material capable of generating heat of hydration (such as quick lime or soft-burned dolomite, etc.).

Mixing and agitation to bring about the compression-shear is accomplished by use of forced-blending mixers, however, since aptitudes of a mixer differ depending on the kinds of cement, amounts of fibrillatable PTFE aqueous emulsion added, temperature-raising methods, amounts of added water and the like, an appropriate mixer is preferably selected from pan-type mixers, two axis bug mill-type mixers and roller-type mixers based on preliminary test results. In the below-mentioned Examples, a roller-type mixer was employed for the mixing and agitation.

Further, a roller-type mixer is best suited for obtaining a dusting-inhibited cement by adding least amount of water, since the cement can be subjected effectively to combined actions of compression-shear and pressing in the space between the roller and the bottom of kneading vessel of the roller-type mixer.

[Example 1]

Nine kinds of dusting-inhibited cement compositions containing 0.03% weight fibrillatable PTFE accompanied respectively with 0.0; 0.001; 0.01; 0.04; 0.06; 0.1; 0.3; 0.5 or 0.7% weight of the antifoamer were prepared. For preparation of the dusting-inhibited cement compositions, an aqueous emulsion of fibrillatable PTFE was employed to be subjected to compression-shear so as all of the PTFE became fibrils. As for the antifoamer, an alcohol base antifoamer containing a polyalkyleneglycol fatty acid ester as the principal component was used.

From those 9 dusting-inhibited cement compositions, test pieces were made according to "The Strength Testing Method" of "Japan Industrial Standard R 5201: The Physical Testing Methods of Cement", and the compressive strength was measured. The composition of 11.1% weight of water, 66.7% weight of aggregate and 22.2% weight of cement was formed in test pieces of 40 mm×40 mm×160 mm in size. The results of compressive strength measurement are shown in FIG. 1. "The base cement" shown with a broken line in the Figure is for measured values of the test pieces which were formed by using the cement without the dusting-inhibiting treatment.

The compressive strength of test piece made from the dusting-inhibited cement adding no antifoamer (0% antifoamer) shows at any age lower compressive strengths than that of test piece made from the cement with no dusting-inhibiting treatment (base cement) as indicated in FIG. 1. On the other hand, as the added amount of the antifoamer increases, the compressive strength recovers accordingly to have the compressive strength of equal or over to that of the test piece made from the base cement when the added amount of the antifoamer becomes 0.1% weight or more. However, the improvement of compressive strength reaches a saturated state when added amount of the antifoamer becomes at around 0.5% weight and reaches a state where further improvement in the compressive strength is unexpectable even though the amount of over 1.0% weight were added.

It is demonstrated that decrease in the compressive strength of the test pieces made from the dusting-inhibited cement composition obtained by adding fibrillatable PTFE and antifoamer to cement and subjecting the resulting mixture to compression-shear to fibrillate the PTFE is smaller in comparison with that of the test piece made from the conventional dusting-inhibited cement composition containing no antifoamer, and that the compressive strength is equal or over to that of test piece made from the base cement.

[Example 2]

A dusting-inhibited cement composition similar to that of Example 1 was prepared with the exception that an emulsion type silicone base antifoamer containing dimethylpolysiloxane as principal component was employed as the antifoamer. To the cement composition was further added 0.25% weight of a rosin soap as an AE-agent. Test pieces similar to those of Example 1 were made, and measurements of the strength ratio, effect of the AE-agents and comprehensive evaluation were conducted. The result is shown in Table 1. In the Table, Strength ratio judged by the ratio of compressive strength of these test pieces of age 28 days compared to a test piece of the same age made from the base cement is indicated with ◎ for that of exceeding 95%, with ○ for that of between 90~95% and with Δ for that of below 90%; Effect of AE-agent judged by the ratio of air entraining rate of these test pieces compared to a test piece made from the base cement is indicated with Δ for that of exceeding 90%, with ○ for that of between 80~90% and with Δ for that of below 80%; and Comprehensive evaluation is indicated with ◎ for that of excellent, with ○ for that of good and with Δ for that of ordinary level.

TABLE 1

| Amount of added antifoamer (%) | Strength ratio | Effect of AE agent | Comprehensive evaluation |
|---|---|---|---|
| 0.000 | Δ | ◎ | Δ |
| 0.001 | ○ | ◎ | ○ |
| 0.010 | ○ | ◎ | ○ |
| 0.040 | ◎ | ◎ | ◎ |
| 0.060 | ◎ | ◎ | ◎ |
| 0.100 | ◎ | ◎ | ◎ |
| 0.300 | ◎ | ○ | ○ |
| 0.500 | ◎ | ○ | ○ |
| 0.700 | ◎ | Δ | Δ |

As indicated by Table 1, the effect of strength improvement becomes recognizable when the antifoamer is added by more than 0.001% weight; the strength improvement effect increases in accordance with the increased amount added; becomes over 95% at around 0.04% weight; and goes further beyond 100% to reach saturated state of the improving effect. On the other hand, the effect of air entraining by means of the AE agent tends to decrease gradually when the amount of added antifoamer exceeds around 0.1% weight, and the effect of AE agent becomes unrecognizable when the amount of added antifoamer exceeds 0.5% weight. Accordingly, the amount of the antifoamer to be added together with the AE-agent preferably being 0.001~0.5% weight ranges, and more desirous effects are obtained when it is 0.04~0.1% weight ranges.

[Example 3]

Eight kinds of dusting-inhibited cement composition were prepared by adding 0.1% weight of antifoamer and 0.0; 0.01; 0.03; 0.05; 0.08; 0.10; 0.12; 0.15% weight of fibrillatable PTFE to cement, and dusting-inhibiting property, handling property thereof were measured and comprehensive evaluation was conducted. The same materials as those of Example 1 were employed as the antifoamer and PTFE. The result is shown in Table 2. In the Table, the dusting-inhibiting property judged by the amount of emitted dust measured with digital dust meters is indicated with ◎ for the dust emission below 50 cpm, with ○ for that of 50~150 cpm and with X for that of above 150 cpm; the handling property evaluated by easiness during transportation and usage is indicated with ◎ for that of excellent, with ○ for that of good and with Δ for that of ordinary level; and the comprehensive evaluation is indicated with ◎ for that of excellent, with ⊙ for that of good and with Δ for that of ordinary level.

TABLE 2

| Amount of added PTFE | Dusting-inhibiting property | Handling property | Comprehensive evaluation |
| --- | --- | --- | --- |
| 0.00 | X | Δ | Δ |
| 0.01 | ○ | ○ | ○ |
| 0.03 | ◎ | ◎ | ◎ |
| 0.05 | ◎ | ◎ | ◎ |
| 0.08 | ◎ | ○ | ○ |
| 0.10 | ◎ | ○ | ○ |

TABLE 2-continued

| Amount of added PTFE | Dusting-inhibiting property | Handling property | Comprehensive evaluation |
| --- | --- | --- | --- |
| 0.12 | ◎ | Δ | Δ |
| 0.15 | ◎ | Δ | Δ |

As shown in Table 2, the sufficient dusting-inhibiting property cannot be achieved when the amount of added PTFE is less than 0.01% weight, and handling quality falls off when the amount of added PTFE is more than 0.1% weight because of deterioration of dispersibility due to excessive agglomeration of cement.

Dusting-inhibited cement composition of this invention has such effects as, (1) dusting is difficult to occur,
(2) the handling property is fine, and
(3) the strength of concrete or mortar is high.

By the way, the bulk density of the dusting-inhibited cement treated with PTFE becomes lower because of entraining air by the PTFE fibril. As a result, concrete or mortal made from the dusting-inhibited cement contain numerous air bubbles, and its strength becomes relatively low. Although the alcohol base antifoamer and the silicone base antifoamer hinder the formation of the air bubbles, the use of the antifoamer of a proper amount does not disturb the air entraining effect of Air Entraining agent or Air Entraing water reducing agent.

What is claimed is:

1. A dusting-inhibited cement composition comprising 100 weight parts of cement, 0.01~0.1 weight parts of fibrillatable polytetrafluoroethylene and 0.001~1.0 weight parts of alcohol base antifoamer and/or silicone base antifoamer.

2. A dusting-inhibited cement composition according to claim 1, wherein at least most of the fibrillatable polytetrafluoroethylene is fibrillated.

* * * * *